Figure 1:
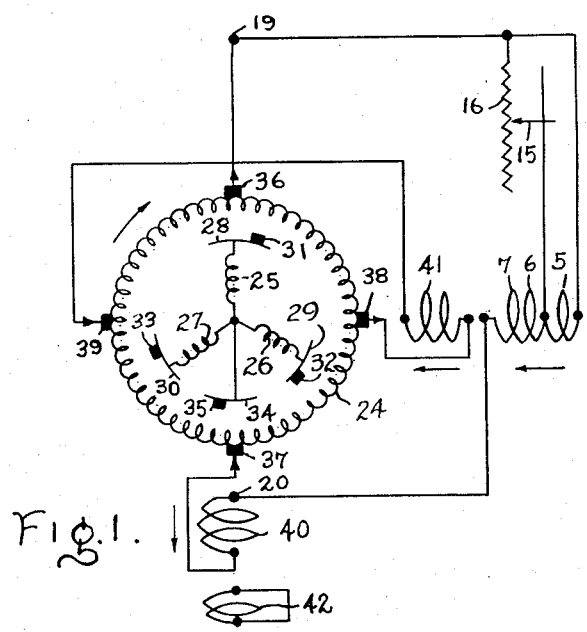

June 18, 1957　　　A. H. MAGGS　　　2,796,580
DYNAMO-ELECTRIC MACHINES
Filed Dec. 14, 1955　　　　　　　　　　　2 Sheets-Sheet 1

INVENTOR
ARTHUR HEMBOROUGH MAGGS
BY
HIS ATTORNEY

June 18, 1957   A. H. MAGGS   2,796,580
DYNAMO-ELECTRIC MACHINES

Filed Dec. 14, 1955   2 Sheets-Sheet 2

INVENTOR
ARTHUR HEMBOROUGH MAGGS
By
HIS ATTORNEY

United States Patent Office 2,796,580
Patented June 18, 1957

2,796,580

DYNAMO-ELECTRIC MACHINES

Arthur Hemborough Maggs, Rugby, England, assignor to The British Thomson-Houston Company Limited, London, England, a British company Application December 14, 1955, Serial No. 553,149

Claims priority, application Great Britain December 23, 1954

6 Claims. (Cl. 322—49)

This invention relates to dynamo-electric machines and more particularly to synchronous alternating current machines of the rotating armature type.

In United States patent application Serial No. 507,369, I have described a synchronous alternating current machine having a slotted core (non-salient pole) field system with a distributed winding of concentric coils, in which the coils of each pole are arranged in at least two groups of which the outer, or greater pitched, coil or coils magnetises the whole or greater part of each pole arc, and the inner, or smaller pitched, magnetises a limited co-axial part of each pole arc, namely, the part embraced by the outermost coil of the inner group. The magneto-motive force of the inner group is made sufficient to maintain saturation of the armature teeth lying within the part of the pole arc embraced by the outermost coil of the inner group, irrespective of the M. M. F. of the outer group, under all normal conditions of armature loading, and the M. M. F. of the outer group is made adjustable over a wide range whereby to control the degree of magnetisation of the part of the pole arc embraced by the outer group but not by the inner group, and so to control the generated E. M. F. over a limited range.

Although the field system, in conjunction with magnetically saturated armature teeth, described in the above application may be embodied in synchronous alternating current machines of either stationary or rotating armature types, the present invention is concerned only with rotating armature machines which have an additional winding on the armature connected to a commutator, from which direct current is taken for the purpose of self-excitation, and which embody the type of field system described above.

In the self-exciting rotating armature type of synchronous alternating current machine having a salient pole field system and an additional winding on the armature connected to a commutator from which direct current for self-excitation is taken, the provision of one additional set of brushes which is connected to an auxiliary field winding co-axial with the main field winding, the additional brush axis being electrically at right angles with the main brush axis, is well known.

The purpose of this auxiliary set of brushes and field winding is to endow the machine with compound voltage characteristics for loads of unity and high power factor. The use of the auxiliary brushgear and field winding is an alternative to the device, also well known, of imparting a considerable forward shift from neutral of the brushgear in a machine not having auxiliary brushes, whereby an almost identical effect may be obtained.

The brush shift method of compounding is less well suited than the auxiliary brush method to a rotating armature machine when it is required to act also as a motor to start an engine which subsequently drives it. Such a rotating armature machine incorporating a compensating winding to ensure a good starting torque with a moderate value of forward brush shift is described in United States patent application Serial No. 453,013. With a large forward shift which is necessary for really adequate compounding, the compensating turns must be increased to such an extent that the added winding resistance has an adverse effect on the starting torque.

Reverting to the machine equipped with auxiliary brushes and associated field winding, the brushgear is normally set so that the main brushes are on the neutral axis and the auxiliary brushes are electrically at right angles therewith. The auxiliary field winding is connected to the auxiliary brushgear so that the auxiliary field ampere-turns are opposed to and greatly exceed the auxiliary armature ampere-turns. This is the case for either direction of rotation without interchange of the connections.

The auxiliary circuit functions as follows. At no-load the E. M. F. generated between the auxiliary brushes is very small or zero and thus little or no current flows in the auxiliary field winding. When an alternating current at unity, or high, power factor flows in the main armature winding the armature M. M. F., or "armature reaction," is at right angles, or thereabouts, electrically with the main field M. M. F. and its direction is such that the resultant M. M. F. produces a field along an axis inclined in the direction of rotation from the main field axis. The component of this field at right angles with the main field axis generates an E. M. F. which appears at the auxiliary brushes and causes a current to flow in the auxiliary field winding which assists the main field ampere-turns, thus tending to increase the main field component and also the generated A. C. E. M. F. As the power factor of the alternating current is decreased in the lagging sense the armature M. M. F. changes direction with respect to the main field M. M. F. until at zero power factor it opposes the main field M. M. F. Thus at zero power factor no E. M. F. appears at the auxiliary brushes and there is no compounding effect.

The object of the present invention is to provide a synchronous alternating current machine of the self-exciting rotating armature type having inherently stable voltage characteristics that are compounded at unity or high power factor loads, and in which at any load the voltage is adjustable over a limited range. A further object of the invention is to render the machine capable of starting the prime mover which subsequently drives it and of charging the battery from which the motoring current is obtained, when these additional features are required.

The invention consists in self-exciting rotating armature synchronous alternating current machine having on the armature a single or polyphase winding connected to slip rings from which the output current is taken, and an auxiliary winding connected to a commutator from which direct current for self-excitation and battery-charging purposes is collected, and having a non-salient pole field system consisting of a slotted core in which the slots carry a distributed main winding of concentric coils the coils of each pole being arranged in at least two groups of which the outer, or greater pitched, coil or coils magnetises the whole or greater part of the pole arc, and the inner, or smaller pitched, magnetises a limited co-axial part of the pole arc, namely, the part embraced by the outermost coil of the inner group, and the magneto-motive force of the inner group is made sufficient to maintain magnetic saturation of the armature teeth lying within the part of the pole arc embraced by the outermost coil of the inner group under all normal conditions of armature loading, and the M. M. F. of the outer group is made adjustable over a wide range whereby to control the degree of magnetisation of the part of the pole arc embraced by the outer group but not by the inner group, and so to control the generated E. M. F. over a limited range, and having, in addition to main commutator brushes connected to the main field winding, auxiliary brushes, electrically at right angles with the main brushes, connected to a compound winding co-axial with the main winding, the connection being in the sense to add to the M. M. F. of the main winding when load is applied.

According to a further feature of the invention there may also be provided on the field system a damping winding electrically at right angles with the main and compound windings, and consisting of short-circuited coils.

A still further feature of the invention consists in providing on the field system a compensating winding electrically at right angles with the main field winding and permanently in series with the commutator winding, one terminal of the compensating winding being connected permanently to the main commutator brushes of one polarity in the sense that the M. M. F.'s of the commutator and compensating windings are mutually opposed.

When the synchronous alternating current machine has an armature, a non-salient pole field system with distributed windings, and main and auxiliary commutator brushgear all as set forth above, in place of a compound winding, the main winding may be divided into halves each with its own half groups of coils, and with the auxiliary D. C. armature circuit interposed between the halves of the main winding, the connection of each half to its auxiliary brushes of like polarity being in the sense to increase the main winding current when load is applied.

Figure 4:
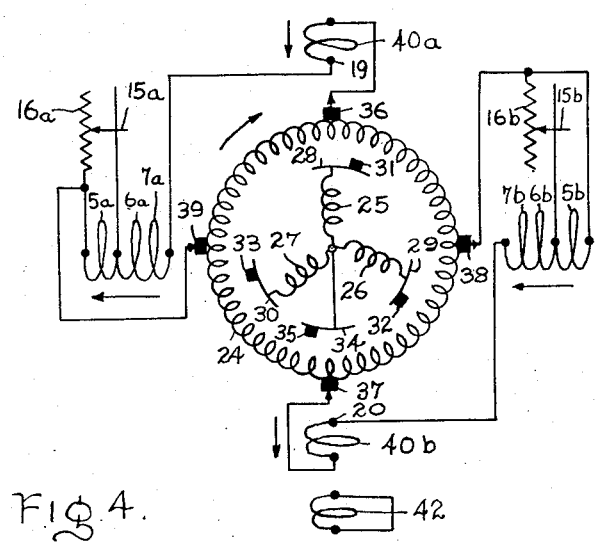
Figure 2:
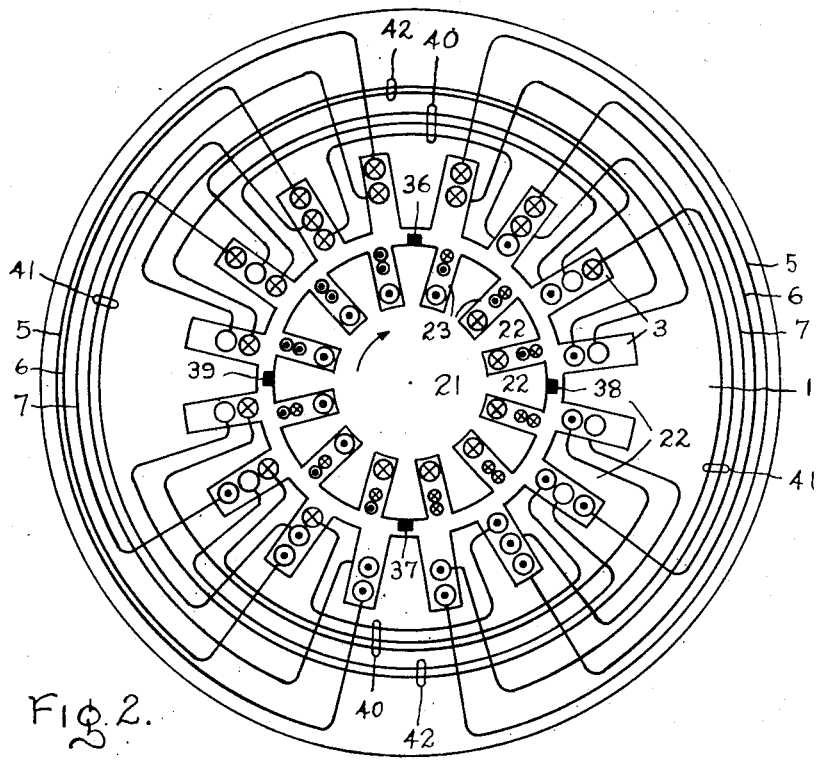
Figure 3:
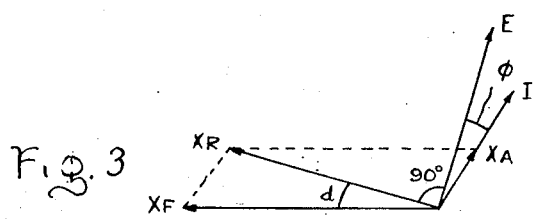

The invention will now be described with reference to the accompanying drawings, in which Fig. 1 is a diagram of connections of the conducting elements of a three-phase two pole machine, Fig. 2 is a schematic cross section of the core and windings of the machine, and Fig. 3 is a space vector diagram of the M. M. F.'s which are present in the machine. Fig. 4 is a diagram of connections of an alternative embodiment of the invention.

In Figs. 1 and 4, 25, 26 and 27 represent the three phases of the A. C. armature winding and these are connected to the three slip-rings 28, 29 and 30 respectively. Brushes 31, 32 and 33 make contact with the slip-rings and are connected to the output terminals, not shown. If required, the neutral point of the winding is connected to a fourth slip-ring 34 with which brush 35, connected to the neutral terminal not shown, makes contact. 24 represents the D. C. armature winding. As shown in Fig. 2, both A. C. and D. C. armature windings occupy the same slots 23, and 21 and 22 represent the armature core and teeth respectively.

Main commutator brushes 36 and 37 and auxiliary brushes 38 and 39 are shown for simplicity as making contact with the winding at the points of commutation. Each brush as shown may represent a number of brushes in parallel. Brush 36 is connected to one main D. C. terminal 19 and brush 37 to one terminal of the compensating winding 40 of which the other terminal is also the other main D. C. terminal 20. The compensating winding, which is shown as a concentric winding, is located in the slots 3, so that its M. M. F. opposes directly the main D. C. armature reaction when the brushgear is set on neutral. 21 and 22 represent the stator core and teeth respectively. The main, or shunt, field winding 5, 6 and 7 as shown is divided into two groups, one, 5, consisting of the outer coil of each pole, and the other consisting of the middle, 6, and inner 7, coils of each pole. The group 5 is shunted by the rheostat 15, 16 and its free terminal is connected to one main D. C. terminal 19, and the free terminal of the section 6, 7 is connected to the other D. C. terminal 20. The auxiliary brushes 38 and 39 are connected to the compound winding 41 of Fig. 1, which is co-axial with the main winding and shown as a concentric winding. The damping winding 42, also shown as a concentric winding is electrically at right angles with the main winding and is short circuited.

In the diagrams, the direction of rotation is assumed clockwise and the mainflux axis is horizontal and its direction right to left. In Fig. 1, the arrows adjacent to the field windings indicate the direction of current flow and of the corresponding M. M. F. In Fig. 2, crosses represent current flowing away from and dots current flowing towards the observer. The innermost row of circles in the rotor slots represents the A. C. armature winding, and the direction of current flow in each circle is representative of a slightly lagging power factor load. The outer two rows of circles in the rotor slots represent the D. C. armature winding, and of the two rows the outer indicates the flow of main D. C. current between brushes 37 and 36, and the inner the flow of auxiliary current between brushes 39 and 38. As previously stated the brushes are shown at the points of current commutation to avoid confusion, since in an actual machine the brush positions depend on the connection of the winding to the commutator. In the stator, the outermost row of circles represents the main field winding, 5, 6 and 7; the middle row of circles is divided between the compound winding, 41, shown carrying current, and the damping winding 42, carrying no current; the inner row of circles represents the compensating winding 40.

The magnetic circuit of the machine is so proportioned that the rotor teeth are highly saturated in comparison with the remaining iron parts, and thus the magnetic flux per unit length of the rotor circumference is limited. The amount of flux per pole is then dependent very largely on the ampere-turns of the outer coils 5 of the main field winding, being a maximum when these ampere-turns are a maximum, i. e. when the rheostat 15, 16 is "all-in," and a minimum when the ampere-turns are zero, i. e. when the rheostat is "all-out." This main field winding connection, which is identical with that shown in Fig. 4 of U. S. patent application Serial 507,369, has been found by experience to be the most generally suitable as compared with those shown in Figs. 2, 3, and 6 of this latter application.

At no-load, the direction of the magnetic flux of the machine is horizontal and from right to left and is co-axial with the main field winding M. M. F. which is represented by the vector $X_F$ in Fig. 3. Although the D. C. armature reaction (M. M. F.) due to the exciting current, which acts vertically upwards is not entirely negligible its effect is small by comparison with the A. C. armature reaction and in the present analysis it will be ignored. The A. C. armature reaction is also substantially in an upward direction for loads of unity or high power factor, but is horizontal and from left to right at zero power factor. The vector $X_A$ represents the A. C. armature M. M. F. for a load of somewhat lagging power factor.

The direction of the vector $X_A$ coincides with the axis of each phase of the A. C. winding at the moment when the current I in it is at the maximum instantaneous value in the positive sense. The resultant of $X_F$ and $X_A$ is shown at $X_R$ and the magnetic flux of the machine on load is co-axial with $X_R$, i. e. is moved forward through an appreciable angle. The vector E is 90 degrees clockwise from the vector $X_R$ and coincides with the axis of each phase at the moment when the generated E. M. F. E in it is at the maximum instantaneous value in the positive sense. As a time vector diagram relative to any one phase, the vectors rotate anticlockwise, and $\phi$ represents the angle of lag of the current behind the E. M. F. The effect of the shift of flux is to cause a considerable E. M. F. to appear between the auxiliary brushes and so to cause a current flow in the compound winding 41. Although there is a slight fall in the main field current due to the flux shift, this is much more than offset by the rise of the compounding current, and thus the machine possesses a compound characteristic at loads of unity or high power factor. If reverse running is required it is only necessary to interchange the main field winding connections to the main D. C. terminals 19 and 20.

The purpose of the damping winding 42 is to suppress the double frequency flux pulsation which would otherwise be set up by the double speed forward rotating component of armature M. M. F. resulting from single-phase loading.

It is possible to dispense with a separate compound winding 41, by dividing the main field winding into halves each with its own half-sections and interposing the auxiliary D. C. armature circuit between the halves. The principal disadvantage of this arrangement which is shown in Fig. 4 is the need to have a rheostat with two separate halves. Strictly also the compensating winding should be in halves, one at each end of the main D. C. armature circuit, if complete equality of the currents in the half main windings is desired.

In Fig. 4 windings that have been divided are identified as in Fig. 1, but one half carries a suffix "a" and the other a suffix "b." The action when load is imposed is that the E. M. F. appearing between brushes 38 and 39 is added to that between brushes 36 and 37 and thus field current is increased. If reverse running is desired it is only necessary to interchange the connections of the main field winding to the main D. C. terminals as in the case of Fig. 1.

What I claim as new and desire to secure by Letters Patent of the United States is:

1. A self-exciting rotating armature synchronous alternating current dynamo-electric machine comprising a stator, a rotor, slip-rings on said rotor, a commutator on said rotor, an alternating current output winding on said rotor connected to said slip-rings, an auxiliary winding on said rotor connected to said commutator, brushes in contact with said commutator from which direct current is obtainable, said stator having slots in which a main distributed multi-pole shunt field winding of concentric coils connected to said brushes is located, the concentric coils of each pole being arranged in at least two groups of which said outer group magnetises the greater part of the pole arc and said inner group magnetises a limited co-axial part of said pole arc and is adapted to provide a magneto-motive force sufficient to maintain saturation of the magnetic circuit of the armature lying within the part of the pole arc embraced by said inner group, means for adjusting the magneto-motive force producible by said outer group whereby to control the alternating E. M. F. generated by said output winding, auxiliary brushes on said commutator, said auxiliary brushes being at right angles electrically to said first-mentioned brushes, a compound winding on said stator co-axial with said main field winding and connected to said auxiliary brushes, the connection of said compound winding being in a sense to add to the magneto-motive force produced by said main winding when load is applied to said machine.

2. A self-exciting rotating armature synchronous alternating current machine as claimed in claim 1 and having on the stator a damping winding electrically at right angles with said main and compound windings and consisting of short-circuited coils.

3. A self-exciting rotating armature synchronous alternating current machine as claimed in claim 2, having on the stator a compensating winding electrically at right angles with the main field winding and permanently in series with said auxiliary rotor winding so that the magneto-motive force of said auxiliary rotor and compensating windings are mutually opposed.

4. A self-exciting rotating armature synchronous alternating current dynamo-electric machine comprising a stator, a rotor, slip rings on said rotor, a commutator on said rotor, an alternating current output winding on said rotor connected to said slip rings, an auxiliary winding on said rotor connected to said commutator, brushes in contact with said commutator from which direct current is obtainable, said stator having slots in which a main distributed multi-pole shunt field winding of concentric coils connected to said brushes is located, said field winding being divided into halves, each half being formed with concentric coils, the concentric coils of each pole being arranged in at least two groups of which the outer group magnetises the greater part of the pole arc and the inner group magnetises a limited co-axial part of said pole arc and is adapted to provide a magneto-motive force sufficient to maintain saturation of the magnetic circuit of the rotor lying within the part of the pole arc embraced by said inner group, means for adjusting the magneto-motive force produced by said outer group whereby to control the alternating E. M. F. generated by said output winding, auxiliary brushes on said commutator, said auxiliary brushes being at right angles electrically to said first-mentioned brushes, one half of said main field winding being connected in series with said auxiliary rotor winding and the other half of said main field winding through said auxiliary brushes so that the magneto-motive force of said main field winding is increased when load is applied.

5. A self-exciting rotated armature synchronous alternating current dynamo-electric machine as claimed in claim 4 having on the stator a damping winding electrically at right angles with said main and compound windings and consisting of short-circuited coils.

6. A self-exciting rotating armature synchronous alternating current dynamo-electric machine as claimed in claim 5 having on the stator a compensating winding electrically at right angles with said main field winding and permanently in series with said auxiliary winding so that the magneto-motive forces of said auxiliary and compensating windings are mutually opposed, said compensating winding being divided into halves located at either end of said auxiliary rotor winding.

No references cited.